United States Patent [19]
Evens

[11] Patent Number: 5,163,698
[45] Date of Patent: Nov. 17, 1992

[54] LOG TRAILER LOAD EXTENSION AXLE ASSEMBLY

[75] Inventor: Robert L. Evens, Hillsboro, Oreg.

[73] Assignee: Peerless Corporation, Tualatin, Oreg.

[21] Appl. No.: 657,174

[22] Filed: Jan. 19, 1991

[51] Int. Cl.⁵ .................................... B62D 53/06
[52] U.S. Cl. ............................. 280/404; 280/401; 280/405.1; 280/407.1; 280/491.2
[58] Field of Search .............. 280/404, 401, 405.1, 280/407.1, 411.1, 412, 419, 455.1, 459, 462, 482, 491.2, 423.1

[56] References Cited

U.S. PATENT DOCUMENTS

| | | | |
|---|---|---|---|
| 2,919,928 | 1/1960 | Hoffer | 280/81.1 |
| 3,082,039 | 3/1963 | Clement | 280/81.1 |
| 3,450,222 | 6/1969 | Ohlson | 280/404 |
| 3,685,853 | 8/1972 | Goldsmith | 280/81.1 |
| 3,910,601 | 10/1975 | Michaud | 280/407.1 |
| 4,219,210 | 8/1980 | Genberg | 280/401 |
| 4,240,647 | 12/1980 | Lewis | 280/404 |
| 4,423,884 | 1/1984 | Gevers | 280/407.1 |
| 4,966,383 | 10/1990 | Sjostrom | 280/404 |

FOREIGN PATENT DOCUMENTS

| | | | |
|---|---|---|---|
| 0189284 | 2/1937 | Fed. Rep. of Germany | 280/404 |
| 0715371 | 2/1980 | U.S.S.R. | 280/404 |

Primary Examiner—Charles A. Marmor
Assistant Examiner—Anne Boehler
Attorney, Agent, or Firm—Marger, Johnson, McCollomm & Stolowitz

[57] ABSTRACT

A load extension axle assembly for extending the load distribution of a tractor-trailer includes a load transfer beam with a front end connected by a horizontal trunnion to the trailer chassis and a rear end carried on a tag axle to trail behind the trailer. The trunnion is fixed to the trailer chassis above and between the tandem axle of the trailer. A first log bunk mounted on the tractor supports the front portion of a load of logs. A second bunk mounted on the load transfer beam between the trunnion and the tag axle supports a rear portion of the load. A vertical pivot in the load transfer beam aft of the second log bunk allows the tag axle to swing relative to the trunnion independently of the load to track behind the tandem axle during turns. A sliding sleeve arrangement between the pivot and the tag axle enables adjusting the length of the load transfer beam. A clamp and actuator coupled to the brake system enables the driver to extend or retract the beam.

32 Claims, 8 Drawing Sheets

LOG TRAILER LOAD EXTENSION AXLE ASSEMBLY

BACKGROUND OF THE INVENTION

This invention relates generally to a load extension axle assembly adapted for use in combination with a conventional tractor and trailer to increase load capacity and to extend the road length over which the load is distributed. In particular, such an assembly, which may alternatively be referred to as a tag axle assembly, is useful to increase and extend the loads carried by tandem axle logging trailers.

Tractor-trailers which haul large loads over highways and bridges must conform to restrictions relating to vehicle weight and load distribution. These restrictions typically are specified in terms of axle loads, number of axles and distribution of the load among axles, groups of axles, and over a given length of roadway, and are commonly known as "bridge formulas." Tractor-trailers adapted for carrying logs typically have a truck-tractor and a trailer connected together by a compensating reach. A first bunk is pivotally mounted by means of a fifth wheel assembly over the drive axles of the truck-tractor to support a forward end of the load. A second bunk is conventionally mounted on the trailer chassis, by means of a fifth wheel assembly mounted on a tandem axle. The load itself transmits towing forces from the truck-tractor to the trailer. The trailer is hitched to the truck-tractor by a reach which is freely extensible for compensating in length while steering the trailer tandem axle. Being mounted on fifth wheel assemblies or the like, the bunks can swivel about a vertical axis while the vehicle is turning. Heretofore, a number of arrangements have been proposed to increase the load carrying capacity, and extend the lengthwise distribution of load, of such vehicles.

U.S. Pat. No. 4,219,210 to Genberg exemplifies the current state-of-the-art in load extenders for logging trucks. This patent shows a tractor-trailer set up for carrying logs substantially as described above. An auxiliary trailer is hitched to the log trailer to increase its capacity and extend its load over an increased length of road surface or bridge span. The auxiliary trailer has a tongue extending forwardly from an auxiliary rear axle and coupled to the main trailer chassis over the dual axles in the location conventionally occupied by the rear bunk. The forward end of the auxiliary tongue includes a trunnion assembly which is mounted atop the fifth wheel or turntable assembly, in place of the rear bunk. The rear bunk is shifted rearwardly, to a position aft of the trailer's tandem axle, and is mounted on a fifth wheel or turntable assembly on the auxiliary trailer tongue.

This arrangement permits the auxiliary trailer to pivot about vertical and horizontal axes which intersect in a common plain with the rocking axis of the tandem axles of the trailer. The trunnion allows the auxiliary axle to rise and fall with variations in terrain and the fifth wheel allows the auxiliary trailer to swing laterally behind the log trailer for turning.

A drawback of this design is that, in turns, the rear portion of the load shifts out of alignment with the central axis of the tandem axles of the trailer. This combination requires a wider swept path and more maneuvering area in turns, as acknowledged by Genberg at column 7, lines 58–68. This arrangement also affects load stability, which can further limit the speed and minimum radius at which turns can be made safely. A commercial load extender made by Cascade Trailer, Inc. of Portland, Oreg., resembles the Genberg load extender but requires customization of the pull trailer chassis. Log trailers using it have turned over while turning when loaded with logs.

Another drawback, acknowledged by Genberg at column 8, lines 50–56, is the difficulty of reversing or backing up with the disclosed auxiliary trailer assembly. The auxiliary tongue of Genberg is also fixed in length. This gives a fixed load distribution among the trailer axles and auxiliary axle and is disadvantageous in off-road terrain.

A number of other structures have been proposed to increase load capacity and distribution. U.S. Pat. No. 4,966,383 to Sjostrom discloses a forward, self steering axle which is mounted forward of the tandem axles and bunk of a conventional log trailer. A portion of the load is transferred to the forward axle by means of leaf springs. U.S. Pat. No. 3,685,853 to Goldsmith and U.S. Pat. No. 3,910,601 to Michaud each disclose a trailing rear axle which is arranged to be raised and lowered on a pivot arm by means of a hydraulic ram, to alter the proportion of load transferred to the auxiliary axle. In Goldsmith, the pivot and trunnion axes intersect as in Genberg. In Michaud, the horizontal trunnion axis is located rearward of the vertical pivot axis.

U.S. Pat. No. 2,919,928 to Hoffer discloses a drop-deck type of trailer in which load is supported between two sets of tandem axles. This trailer has a bogey assembly with caster wheels. The main rocking beam of the bogey assembly is connected to the rear end of the trailer by means of a trunnion positioned rearward of the trailer axles. A lock shaft anchors the front end of the main beam at a point centered between the tandem axles of the trailer. The auxiliary trailer axles themselves are mounted in castor fashion so as to trail behind a vertical pivot axis.

U.S. Pat. No. 3,082,039 discloses a conventional tag trailer which supports an independent load on an auxiliary axle. U.S. Pat. No. 3,450,222 to Ohlson discloses a self propelled vehicle having three wheeled sections wherein a portion of the load is transferred to the rearmost axle by means of a rigid lengthwise connection.

None of the foregoing patents address the drawbacks noted above in connection with the Genberg and Cascade Trailer load extenders. Several of these designs show some ability to extend or retract the load extension beam or tongue. Prior extension/retraction systems nonetheless are complex and expensive, inconvenient to operate, and/or would be impractical to integrate into an auxiliary trailer assembly for logging trailers, such as that of Genberg.

Accordingly, a need remains for a better arrangement for increasing load capacity and extending the lengthwise distribution of load in tractor-trailer combinations, particularly those used for hauling logs and the like.

SUMMARY OF THE INVENTION

It is, therefore, one object of the invention to provide an improved assembly for increasing load capacity and extending load distribution over an increased length, particularly for logging trucks.

A second object of the invention is to increase and extend load capacity without adversely affecting vehicle stability.

Another object of the invention as aforementioned is to increase and extend load capacity without materially increasing the swept path of the overall combination when making a turn.

A further object is to make it easier to reverse or back up a tractor-trailer combination which includes a load extension or tag axle assembly.

Yet another object of the invention is to enable a tag axle assembly to be easily extended or retracted.

The invention is a load extension axle assembly comprising a forward, load supporting portion connected to a trailer chassis by means of a trunnion mounted between the tandem axles of the trailer, a rear portion having an auxiliary or tag axle at the rear end thereof and connected to the forward portion of the assembly by means of a vertical pivot arranged to transfer load from the forward portion to the tag axle. The trunnion is located between the tandem axles of the trailer and the pivot is positioned aft of the tandem axles so that the respective horizontal and vertical axes are spaced apart lengthwise of the load extension assembly. A load support means, such as a log bunk, is mounted between the trunnion and the pivot, preferably midway between the trunnion and the pivot and approximately over the rearward axle of the trailer's tandem axles. This arrangement maintains the rearward end of the load substantially in alignment between the tandem axles in turns as well as when the overall combination is traveling in a straight line. This substantially improves load stability and minimizes the swept radius of the vehicle and load in turns. For use in carrying elongated loads such as a log, the load support means can be a log bunk which is mounted on a fifth wheel or turntable assembly so that it can pivot about a vertical axis.

Preferably, the pivot between the forward and rear portions of the load extension assembly is arranged with a stop means for limiting its angular range of travel about the vertical axis to facilitate control during reversing or backing up of the combination of tractor-trailer and load extension assembly. It is also preferred that the axis of the pivot be oriented at a small (e.g., 2°) angle forward from a true vertical orientation to provide a negative caster so that the load extension axles will track true behind the tandem axles of the trailer. Further, the load transfer beam assembly can be retracted and extended to meet varying loading requirements, using a novel beam/axle slider attachment.

This invention can be implemented as a retrofit of existing tandem axle pole trailers, as in the preferred embodiment described and shown herein, or can be implemented integrally in the design of a pole trailer.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

Although the invention is not so limited, the above-described figures are drawn substantially to scale from an operative, preferred embodiment of the invention.

DETAILED DESCRIPTION

Figure 1:
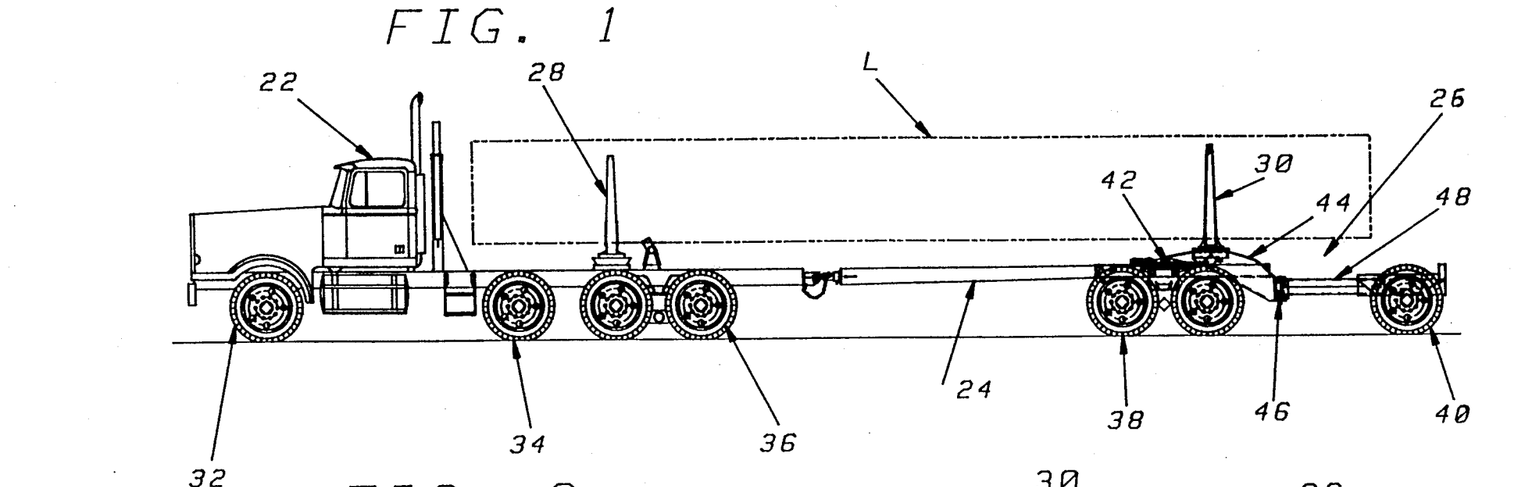
FIG. 1 is a side educational view of a combination logging tractor-trailer with a load extension axle assembly in accordance with the invention, showing the load extension axle assembly in an extended position and a log load in dashed lines.

FIG. 1 shows a combination tractor-trailer and load extension assembly for carrying a load of logs L. A truck-tractor 22 has a pole trailer 24 hitched to the rear end of its chassis. A load extension assembly 26 in accordance with the invention is coupled to the pole trailer.

The truck-tractor and pole trailer are largely conventional and so are only briefly described. A first conventional log bunk 28 is pivotally mounted on the truck chassis for carrying a front portion of the load L. A second log bunk 30 is pivotally mounted on assembly 26, as further described below, for carrying a rear portion of the load L. The truck-tractor has a steering axle 32, an optional liftable pusher axle 34 and tandem drive axle 36. The truck chassis has a rear end or stinger with a hitch which protrudes rearward of the drive axles for a stinger steering of the pole trailer 24. This is a conventional way to minimize swept width of the overall vehicle and load in turns. The pole trailer has a tandem axle 38 which is towed by the load L and a compensating reach which steers the axle 38 through turns while extending or contracting relative to the fixed length of the load. The trailer has a second chassis mounted on the tandem axle. Conventionally, the second bunk would be pivotally mounted on the trailer chassis but is removed so that the load extension assembly 26 can be coupled to trailer 24 as next described.

Figure 3:
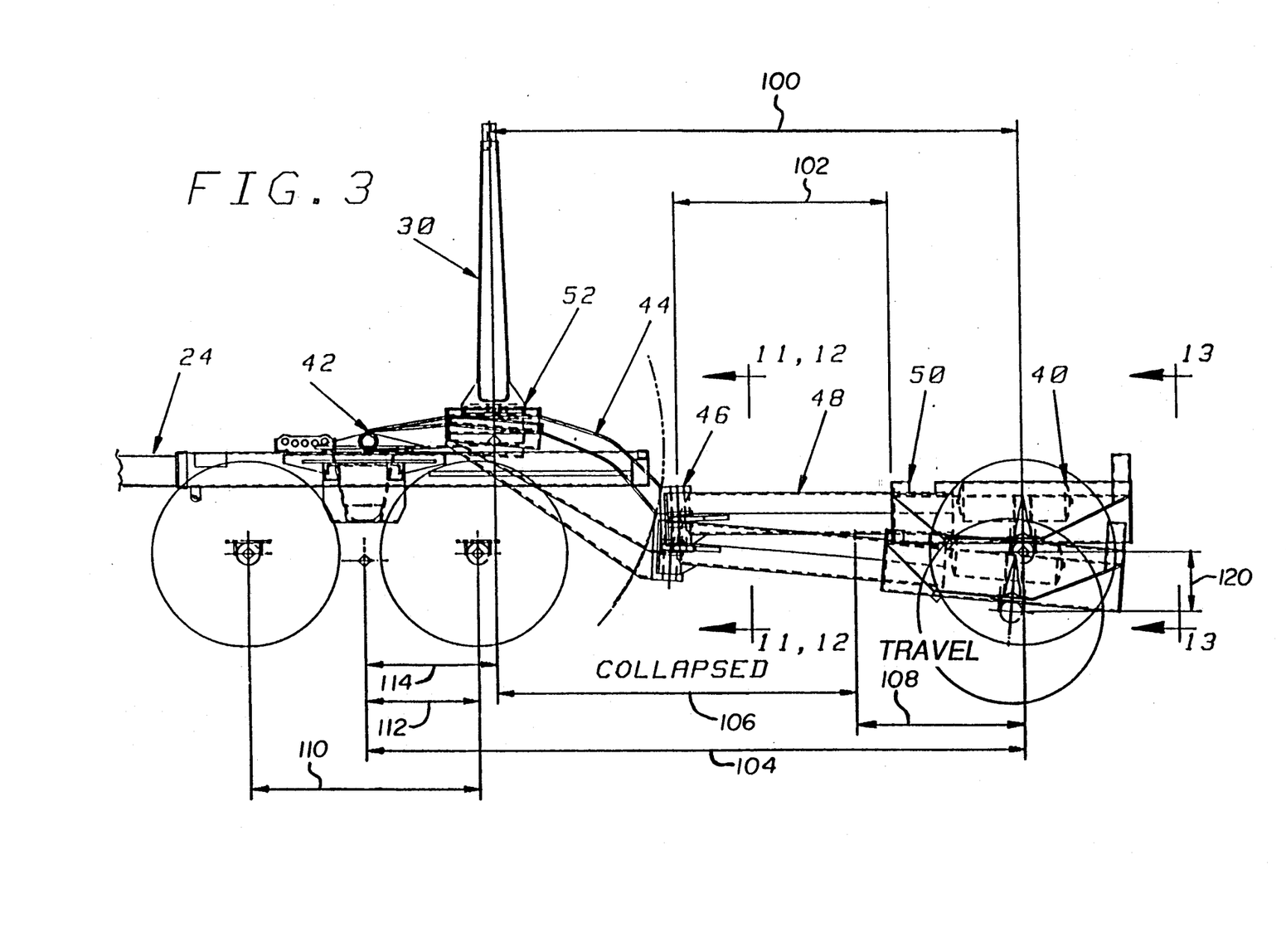
FIG. 3 is an enlarged side elevational view of the tandem axle pull trailer and load extension axle assembly of FIG. 1.
Figure 4:
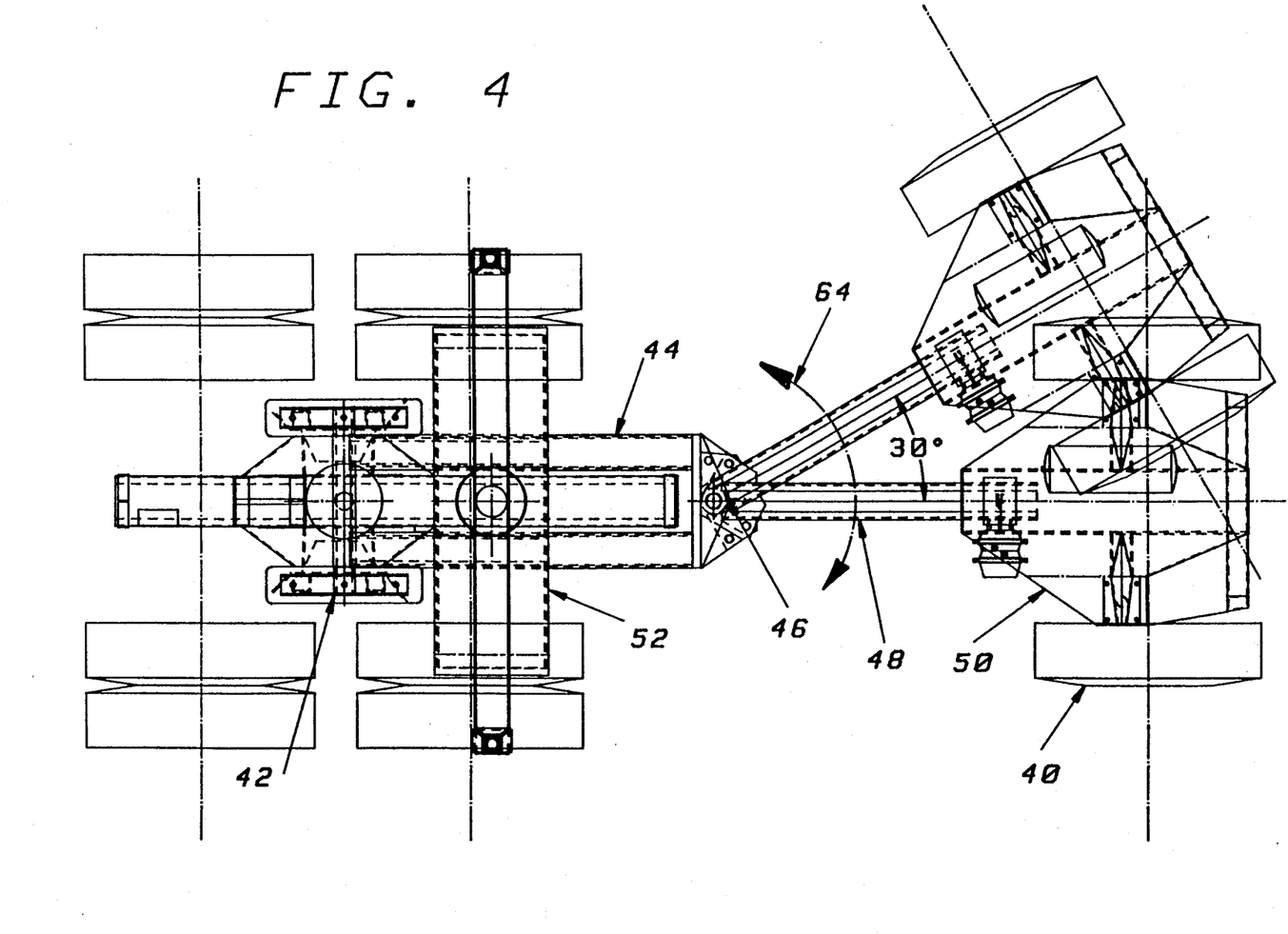
FIG. 4 is a top plan view of the assembly of FIG. 3.

The load extension axle assembly 26, shown in greater detail in FIGS. 3 and 4, extends the load-carrying capacity of the tractor-trailer 22, 24 over an increased length. Details of construction are shown in the drawings by way of illustration and not limitation. For example, the forward portion 44 is shown constructed with channel steel but could alternatively be made using I-beam construction. Such details are deemed within the skill of those working in the art and so are not described except where pertinent to an aspect of the invention.

Assembly 26 includes an elongate load transfer beam coupling a tag axle 40 to trailer 24 by means of a trunnion 42. The load transfer beam has a forward, load-bearing portion 44, and a rearward, load-transfer portion 48, pivotally interconnected by a pivot 46. Tag axle 40 is connected to support the rearward portion of the load transfer beam at a position spaced rearward of the tandem axle 38.

Horizontal trunnion 42 connects the forward portion 44 to the chassis. The trunnion is fixedly mounted on the trailer chassis, directly on the scale structure in a retrofit of the pole trailer. It is oriented for angular movement of the load transfer beam about a fixed horizontal axis parallel to the tandem axle, as shown by arrow 60 in FIGS. 3 and 5. The trunnion is spaced between the two axles 38, preferably positioned sufficiently aft of a midpoint between the tandem axles to unload the reach and hitch of trailer 24. For an axle spacing of 51 inches, the horizontal axis of the trunnion is suitably positioned 25 inches forward of the rearmost of axles 38.

Figure 5:
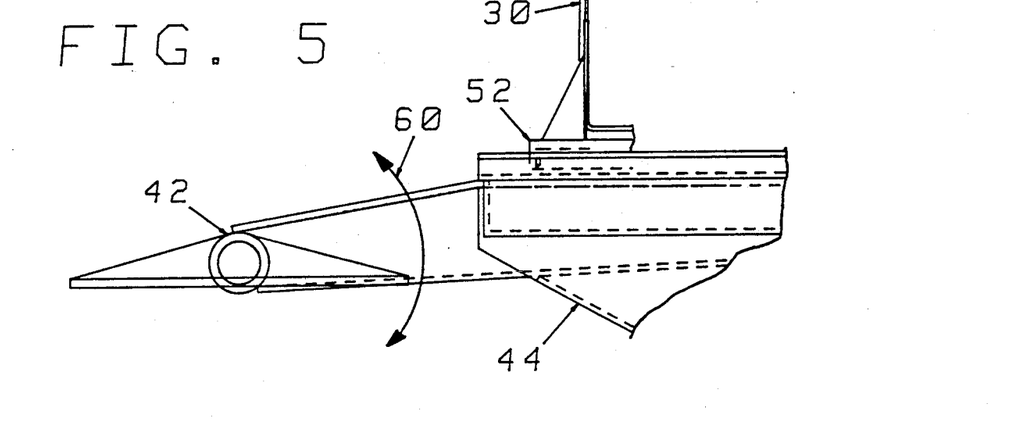
FIG. 5 is a further enlarged side elevational view of the front end of the assembly of FIG. 3 showing details of assembly of the trunnion and load supporting structure of one assembly.

The second bunk 30 is mounted on the load-bearing forward portion 44 of the load transfer beam for supporting a rear portion of load L. The second bunk 30 is positioned above and a few inches aft of the rearmost of axles 38. It is pivotally mounted on a fifth wheel or turntable assembly 52 on the forward portion 44 of the load transfer beam for pivoting about a vertical axis independently of angular movement of the load transfer beam.

A load-transferring pivot 46 interconnects the forward and rearward portions 44, 48 of the load transfer beam at a position between bunk 30 and axle 40. The forward portion of the load transfer beam has a length such that the pivot is spaced rearward of the tandem axle of the trailer. The pivot 46 is structured as shown in FIG. 6 to transfer a portion of the load to the rearward portion 48 while permitting angular movement of such portion relative to the forward portion 44 about an approximately vertical axis.

The pivot includes a rigid hitch assembly 70 formed by a pair of vertically-spaced horizontal plates 72 mounted on backing plate 74, which is connected to the rear end of the forward portion 44 of the load extension beam. The front end of the rearward portion 48 of the load extension beam terminates in a generally vertical, elongate tubular member 75 having a vertical length matching the spacing of plates 72. The tubular member has a central bore which aligns coaxially with a pair of holes 71 (FIG. 12) in plates 72 to receive a cylindrical pin 76.

This pivot structure enables the rearward beam portion and tag axle to swing laterally behind the chassis independently of the load as shown by arrow 64 in FIG. 4. The trunnion 42 and pivot 46 are spaced apart lengthwise of the assembly, and the load bunk 30 is spaced between the trunnion and the pivot so as to transfer a fraction of the rear portion of the load through the pivot to the tag axle.

Figure 6:
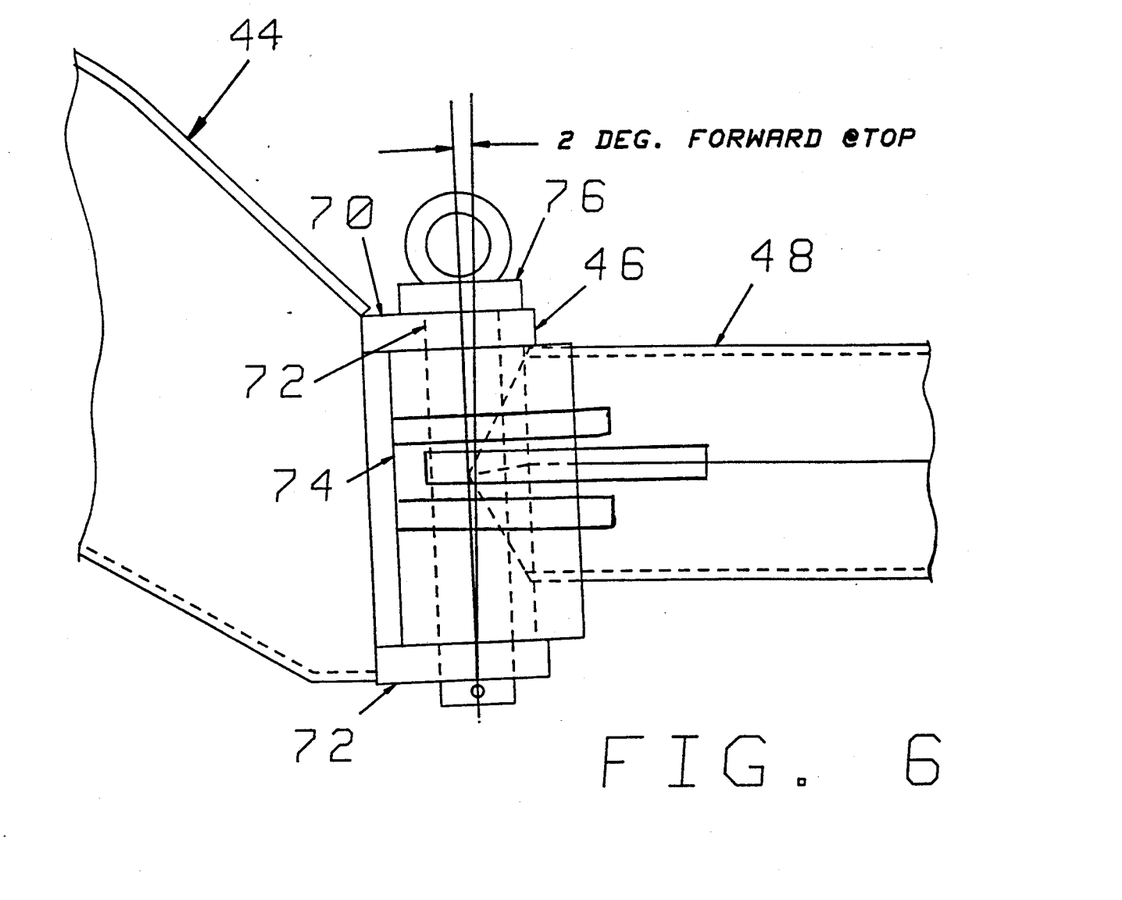
FIG. 6 is a further enlarged side elevational view of a mid-portion of the assembly of FIG. 3 showing details of construction of the pivot interconnecting the forward and rearward portions of the load extension axle assembly.

The pivot has an axis tilted at an angle, preferably 2° from vertical as shown in FIG. 6, to provide a negative caster such that swinging of the rear portion of the load extension beam laterally of the trailer chassis increases loading of the tag axle 40. The portion of load transferred to the tag axle is at a minimum when the tag axle is tracking in a centered position in parallel alignment behind the tandem axle. This arrangement urges the tag axle to track in a centered position behind the tandem axle 38.

The trunnion 42 and pivot 46 are oriented and spaced lengthwise apart to permit angular movement about perpendicular axes spaced forward and aft, respectively, of the second log bunk 30. The trunnion 42 enables the load transfer beam, tag axle, second log bunk and the load portion supported thereby to move as a unit angularly about a horizontal axis as indicated by arrow 60 in FIGS. 3 and 5. This allows the assembly to equilibrate load distribution between the tag axle and the tandem axle and to adjust to variations in terrain. The pivot permits the tag axle to swing during turns relative to the second chassis, trunnion and load bunk about a generally vertical axis, as shown by arrow 64 in FIG. 4, to track behind the tandem axle independently of the rear load portion.

Figures 9, 10:
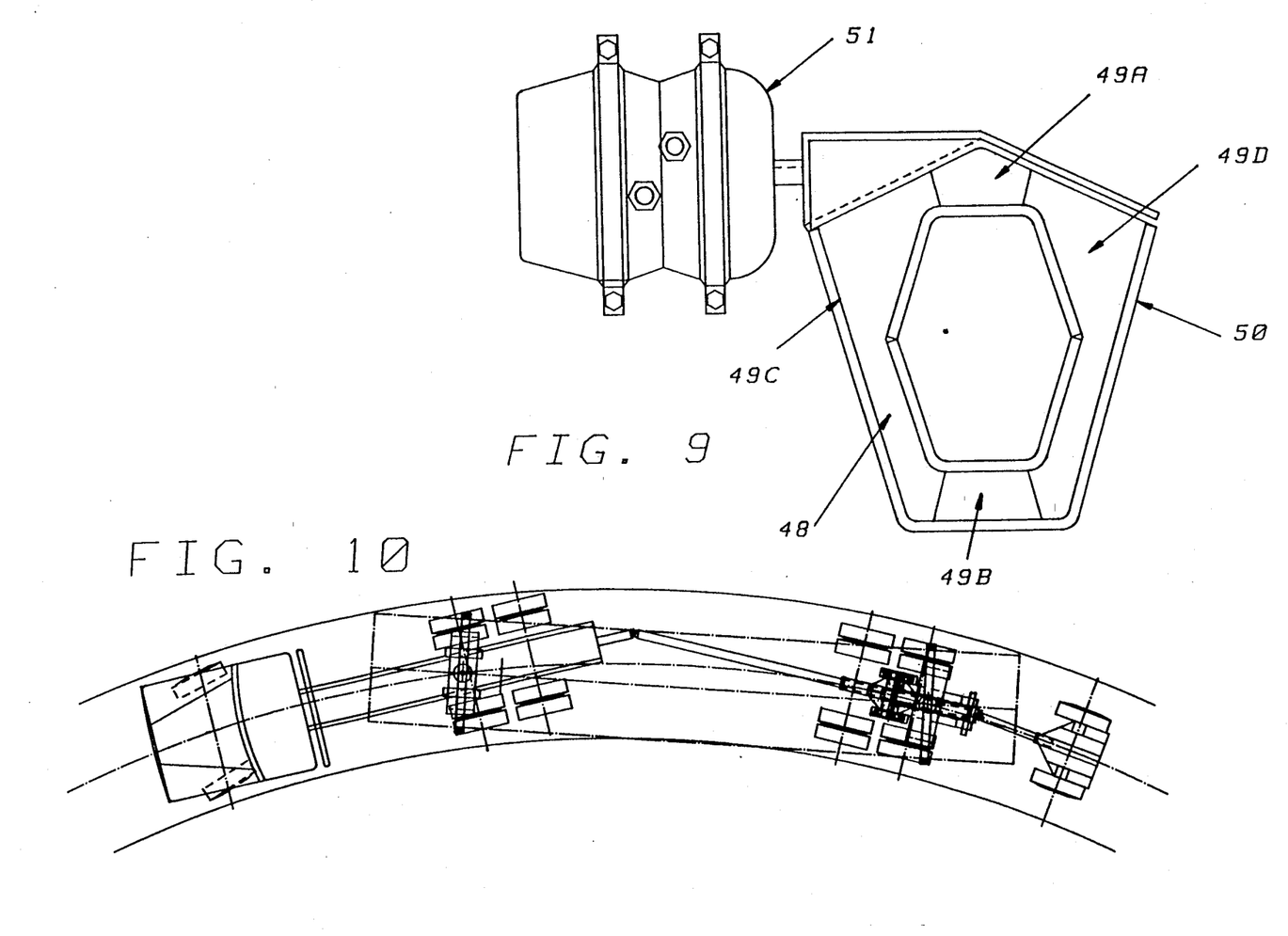
FIG. 9 is a cross-sectional view taken along lines 9—9 in FIG. 4 showing the transverse structure of the bushing and slider assembly.
FIG. 10 is a top plan view showing the overall logging tractor-trailer and load extension axle assembly of FIG. 1 in a turn, with solid-line curves indicating the swept path of the trailer and load and a dashed-line curve indicating the path traversed by the vertical pivot axes of the log bunks.

Consequently, the bunk 30 and rear portion of load L remains laterally static as the tag axle swings laterally behind the pole trailer during turns, as shown in FIG. 10. The log bunks 28, 30 are pivotally mounted on the truck chassis and the forward portion 44 of the load transfer beam, respectively. Thus, the log load portions can pivot about vertical axes independently of the tractor and trailer chassis and the load transfer beam. The vertical pivot axes traverse a common arc during a turn. That is, the vertical pivot axis of the rear bunk 30 tracks along substantially the same radius as the vertical pivot axis of the front bunk 28. This arrangement maintains the minimum swept width provided by stinger steering and provides lateral stability of the trailer, load extension and load L through turns.

Figure 2:
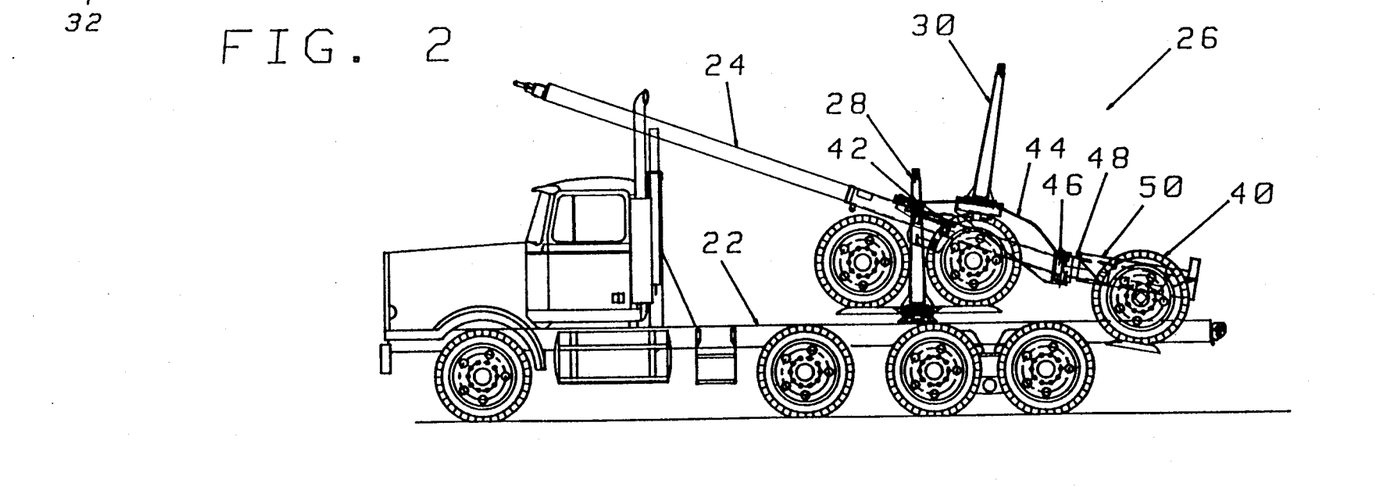
FIG. 2 is a side elevational view of the apparatus of FIG. 1 with the load extension axle assembly retracted and the tandem axle pull trailer and load extension axle assembly unhitched and mounted as a unit atop the truck-tractor chassis for unloaded travel.

Referring to FIGS. 2-4, the load transfer beam includes a sleeve member 50 in which the rear portion 48 of the load transfer beam is slidably received for adjusting the length of the load extension beam. The load extension beam can be fully retracted for traversing rough, off-road terrain or for carrying the pole trailer 24 and load extension assembly 26 on the truck-tractor chassis without disassembly, as shown in FIG. 2. The load extension beam can be extended fully or partially for carrying a load on the highway. In one operative embodiment shown in FIG. 3, the range of extension is over 3 feet, from a maximum extension between bunk 30 and axle 40 of 10 feet to a minimum extension under 7 feet.

Sleeve member 50 is a structural sleeve having a first internal polygonal cross section and the rear portion 48 has a second external polygonal cross section sized and shaped to fit loosely within the first cross section and to resist twisting of the rear portion within the sleeve. These cross sections each have a vertical dimension greater than their respective horizontal dimensions. Preferably, the sleeve has a pentagonal cross section and the rear portion has a hexagonal cross section nested loosely within the pentagonal cross section.

Figure 7:
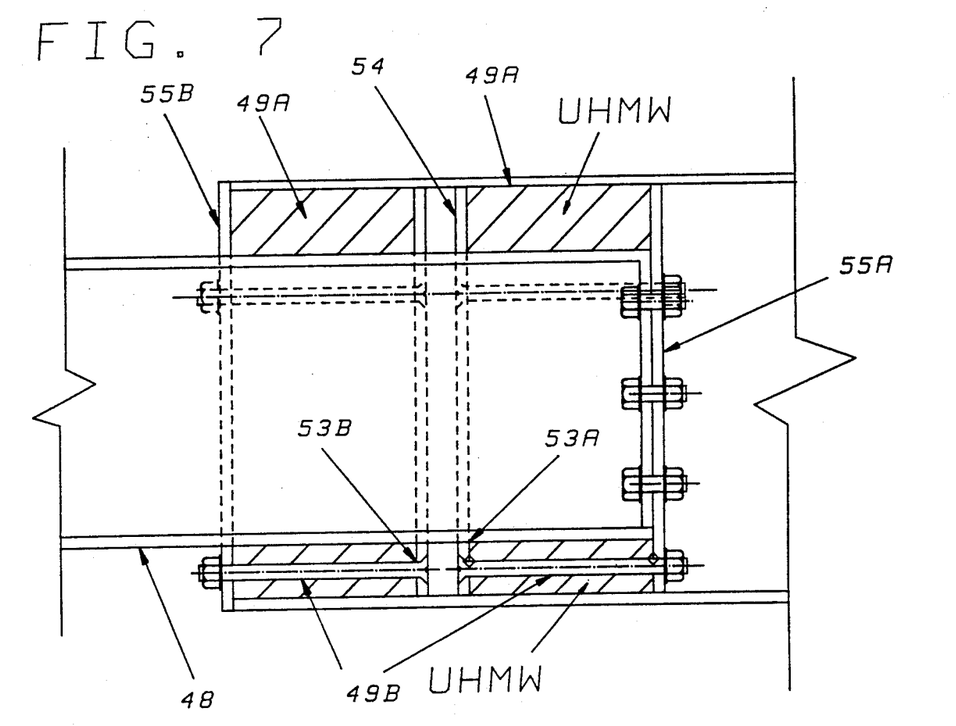
FIG. 7 is a sectional view taken along lines 7—7 in FIG. 4 showing the lengthwise structure of the load transfer beam and beam/axle slider attachment.

The sleeve includes two sets of bushings, spaced apart lengthwise as shown in FIG. 7, and sized and shaped to fit conformably between the inner and outer polygonal cross sections, as shown in FIG. 9. The bushings include pairs of elongate pentagonal and trapezoidal wedges 49A, 49B of ultra-high molecular weight (UHMW) plastic material. This material substantially frictionlessly engages the metal upper and lower sides of the rear portion of the load transfer beam to allow sliding thereof under load. Pairs of side bushings 49C, 49D are suitably formed of urethane material, as mirror images of one another, on opposite lateral sides of member 48. The UHMW bushings are relatively incompressible and thus resist vertical compression between the hexagonal inner member 48 and the outer pentagonal sleeve 50, while the urethane bushings are compressible to allow lateral and torsional flex. The bushings are retained in lengthwise position, as shown in FIG. 7, by a pair of intermediate plates 53 that are spaced apart lengthwise to define intermediate space 54, and a pair of end plates 54, 55. The distal end of portion 48 is closed and bolted to bushing end plate 54. The intermediate plate 53A is bolted to plate 54 to retain the bushings lengthwise between the two plates. Plates 53A and 54 are connected to portion 48 and slidable within the sleeve. The sleeve has end plate 55 welded to its distal end and, together with the attached bushings, serves as a stop to retain the rear portion 48 within sleeve 50. Intermediate plate 53B is bolted to plate 55 to retain the bushings lengthwise between the two plates 53B, 55 so that they do not move with portion 48.

Figure 8:
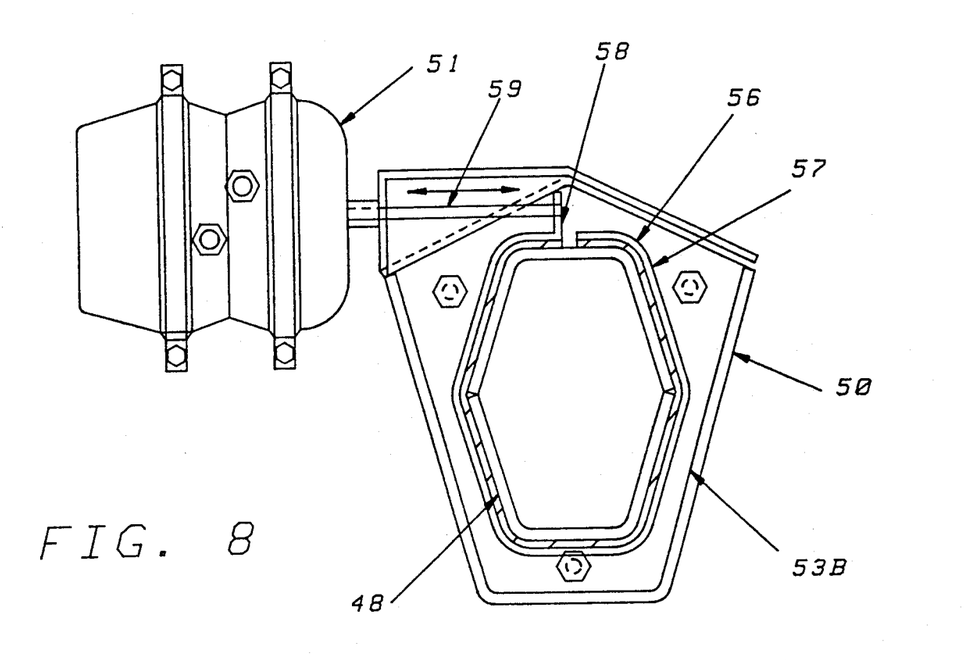
FIG. 8 is a cross-sectional view taken along lines 8—8 in FIG. 4 showing the transverse structure of the clamping structure of the beam/axle slider attachment and actuator.

For securing the rear portion 48 in a selected extension position, the sleeve member 50 includes a clamping mechanism, located in the space 54 between the bushings shown in FIG. 8, operated by air actuator 51. The clamping mechanism includes a metal brake band 56 having a layer of brake material 57 surrounding the rear portion 48 of the load transfer beam. The right portion of the brake band is welded to plate 53B along about half the length of the band. The left portion of the brake band is free within space 54 and terminates in an upward-protruding actuation ear 58. Optionally, the band can be hinged at the bottom.

The actuator 51 includes a linear actuation member 59 connected to the actuation ear 58 of the band for tightening and loosening the band around rear portion 48. The actuator is spring-biased to a normally-extended position so as to clamp the brake band around portion 48 unless and until actuated by input of pressurized air. Only then, the spring-loaded pneumatic actuator 51 unclamps the rear portion for sliding within the sleeve to adjust the length of the load extension beam.

Figure 14:
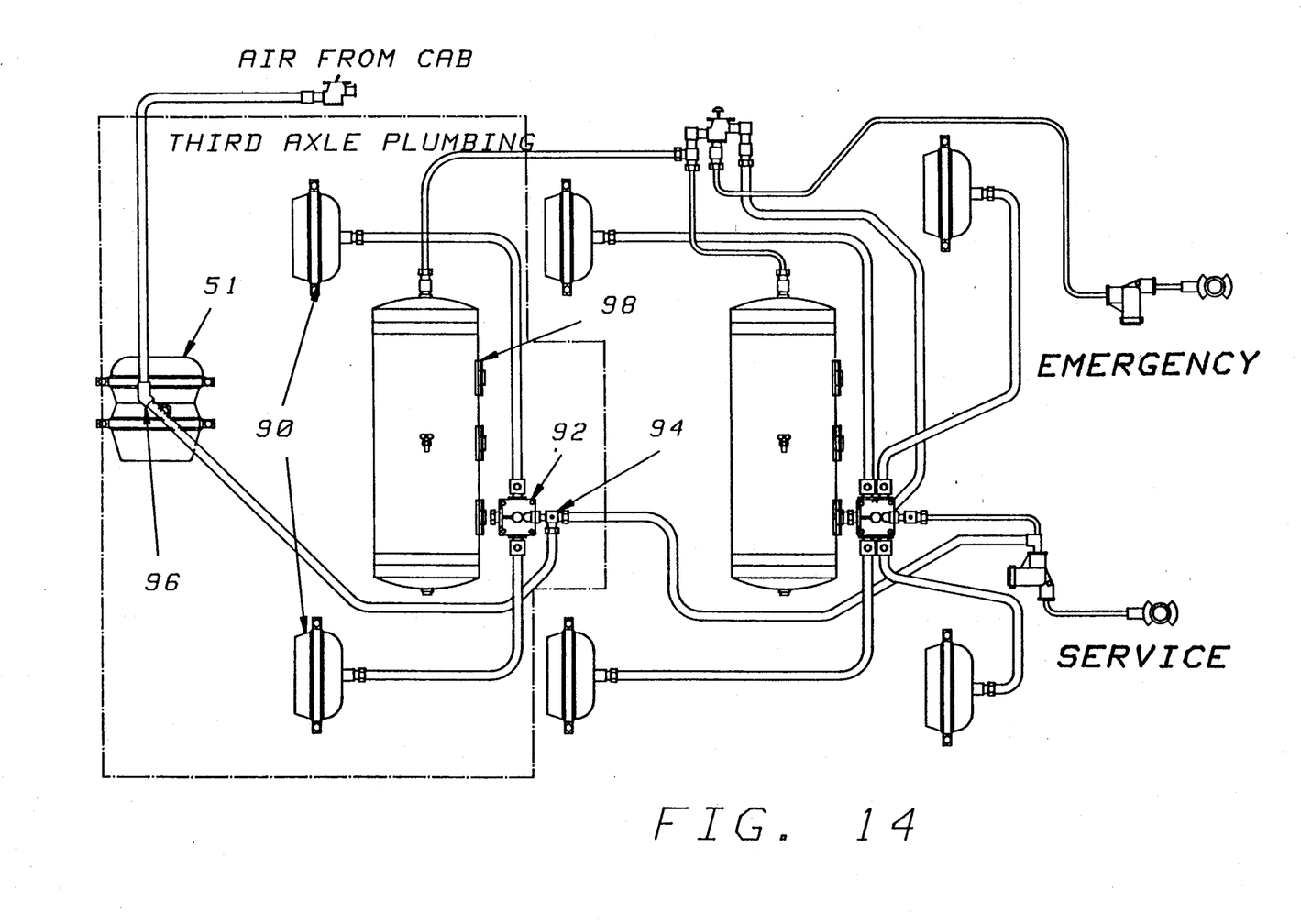
FIG. 14 is a diagram of the air brake circuit for actuating the clamping mechanism of FIGS. 4 and 8.

The actuator 51 is remotely controllable for actuating the clamp as shown in FIG. 14. The brake control circuit that is conventionally operable by a driver to actuate the brakes for the first and second axles is augmented to include brake chambers 90 on axle 40 and a conventional brake activating relay valve 92. To operate actuator 50 the circuit further includes a subcircuit operable by a manual driver control coupled to input air to the actuator 50. This subcircuit is also coupled to the brake chambers 90 via a two-way relay valve 94. After air fills actuator 50 to unclamp the clamping mechanism, the subcircuit continues to direct air into chambers 90. Operation of the driver control thus brakes the tag axle 40 simultaneously with unclamping the rear portion 48 of the load extension beam without braking the other axles.

This action enables the tractor trailer axles to be rolled forward or backward while the tag axle 40 is immobilized to extend or retract the load extension beam. The subcircuit is operable upon deactuation of the clamping mechanism to reclamp the rear portion of the load extension beam and also to release the brakes of the tag axle 40. To expedite this step, a quick release valve 96 is included on chamber 51. To meet safety requirements, an auxiliary air tank 98 can be included in the subcircuit.

Figure 11:
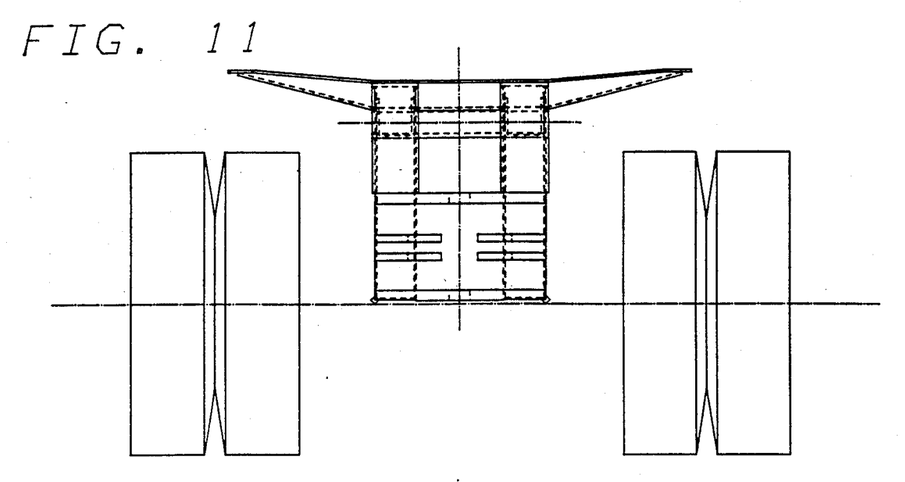
FIG. 11 is a cross-sectional view taken along lines 11—11 in FIG. 3 showing a rear elevation of the front portion of the load extension assembly.
Figure 12:
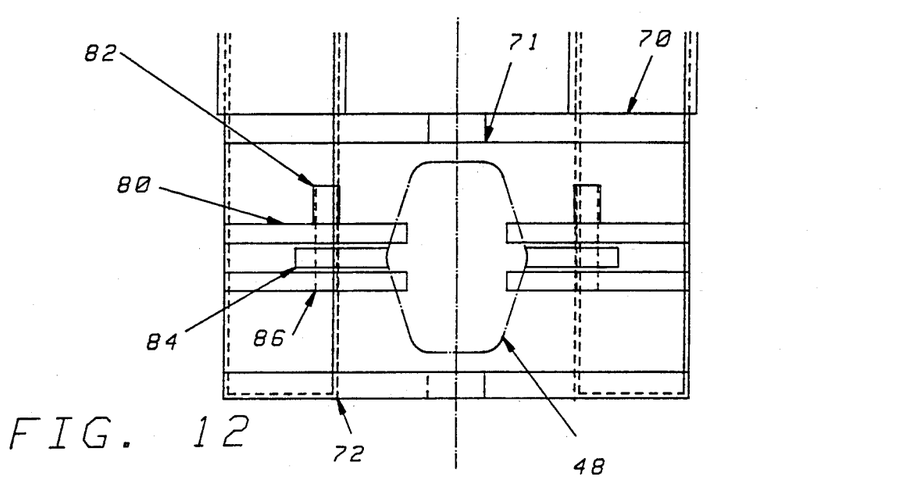
FIG. 12 is an enlarged view of a portion of FIG. 11 showing details of the pivot structure.
Figure 13:
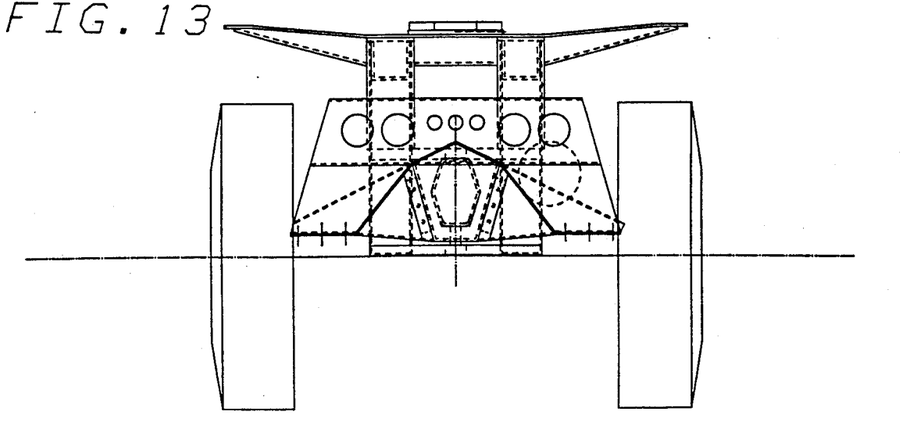
FIG. 13 is an end elevational view of the load extension assembly as viewed along lines 13—13 in FIG. 3.

Referring to FIGS. 11 and 12, the pivot hitch structure 70 includes means for limiting the angular pivotal movement of the rear portion to a predetermined range of angles.

For normal use, the rear portion 48 is free to move horizontally through a maximum range of 30° about center (see FIG. 4) defined by abutment plates 80, 84. Plates 84 are mounted on the sides of portion 48, and have frontal faces formed at an angle of 30° to butt against the backing plate 74 when beam portion 48 swings out to that angle in either direction from the lengthwise centerline of the assembly 26. Similarly, two pairs of plates 80, vertically spaced above and below plates 84 and mounted on the backing plate 74, have side faces formed at an angle of 30° to butt against beam portion 48 when it swings out to that angle in either direction.

For backing up, the load extension beam is fixed in a centered position. A tube 82 is mounted over coaxial pin holes in plates 80, which align with holes in plate 84 when the assembly 26 is centered behind the pole trailer, for dropping centering pins through the plates 80, 84 on both sides of the pivot. With the pins in place, the rear portion 48 of the load transfer beam is immobilized in a centered position. This prevents jack-knifing of the load extension assembly 26 and enables it to be steered together with the pole trailer during reversing. Steering is made easier yet by retracting the load extension beam in the beginning stage of backing up the combination tractor-trailer and load extension axle assembly.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A load extension axle assembly for extending load-carrying capacity of steerable chassis carried on tandem axles, the assembly comprising:

an elongated load transfer beam including a forward, load-bearing portion and a rearward, load-transfer portion;

a tag axle connected to support the rearward portion of the load transfer beam at a position spaced rearward of the tandem axles;

trunnion means connected the forward portion to the chassis for angular movement of the load transfer beam about a horizontal axis parallel to the tandem axle;

load bearing means mounted on the forward portion of the load transfer beam for supporting a load;

load transferring pivot means interconnecting the forward and rearward portions of the load transfer beam for transferring a portion of the load to the rearward portion while permitting angular movement of the rearward portion relative to the forward portion about an approximately vertical axis so that the rearward beam portion and tag axle can swing laterally behind the chassis independently of the load;

the trunnion means and pivot means being spaced apart lengthwise of the assembly, and the load-bearing means being spaced between the trunnion means and the pivotal means so that the load-bearing means remains laterally static as the tag axle swings laterally during turns;

said pivot means having an axis tilted at an angle from vertical such that swinging of the rear portion of the load extension beam laterally of the chassis increases loading of the tag axle and thereby induces the tag axle to track in a centered position behind the tandem axles.

2. An assembly according to claim 1 in which the trunnion means is spaced between the tandem axles.

3. An assembly according to claim 2 in which the forward portion of the load transfer beam has a length such that the pivot means is spaced rearward of the tandem axles.

4. An assembly according to claim 1 in which the rear portion of the load transfer beam includes an extension means for adjusting the length of the load extension beam.

5. An assembly according to claim 4 in which the extension means includes a sleeve member in which the rear portion of the load transfer beam is slidably received and means for securing the rear portion in a selected position within the sleeve member.

6. An assembly according to claim 5 in which said securing means includes a clamping means for clamping the rear portion within the sleeve and actuator means for unclamping the rear portion for sliding within the sleeve to adjust the length of the load extension beam.

7. An assembly according to claim 1 in which the pivot means includes means for limiting the angular pivotal movement of the rear portion to a predetermined range of angles such that the load extension assembly is steerable during reversing.

8. An assembly according to claim 1 in which the load-bearing means is pivotally mounted on the forward portion of the load transfer beam for pivoting about a vertical axis independently of angular movement of the load transfer beam rearward portion and pivot means.

9. A load extension axle assembly for extending load-carrying capacity of steerable chassis carried on tandem axles, the assembly comprising:

an elongate load transfer beam including a forward, load-bearing portion and a rearward, load-transfer portion;

a tag axle connected to support the rearward portion of the load transfer beam at a position spaced rearward of the tandem axle;

trunnion means connecting the forward portion to the chassis for angular movement of the load transfer beam about a horizontal axis parallel to the tandem axle;

load bearing means mounted on the forward portion of the load transfer beam for supporting a load;

load transferring pivot means interconnecting the forward and rearward portions of the load transfer beam for transferring a portion of the load to the rearward portion while permitting angular movement of the rearward portion relative to the forward portion about an approximately vertical axis so that the rearward beam portion and tag axle can swing laterally behind the chassis independently of the load;

the trunnion means and pivot means being spaced apart lengthwise of the assembly, and the load-bearing means being spaced between the trunnion means and the pivotal means so that the load-bearing means remains laterally static as the tag axle swings laterally during turns;

said pivot means being tilted about 2° forward from a true vertical axis so that the portion of load transferred to the tag axle is at a minimum when the tag axle is tracking in a centered position in parallel alignment behind the tandem axles.

10. A tractor-trailer and load extension assembly for carrying a load of logs, comprising:

a tractor having a first, axle-driven chassis and a first log bunk mounted on the chassis for carrying a front portion of the load;

a trailer having a second chassis mounted on a trailer axle and steerably hitched to a rear end of the first chassis;

a load extension assembly including a load transfer beam connected at its front end to the second chassis and a rear carried on a tag axle to trail behind the trailer;

a trunnion pivotally connecting the front end of the load transfer beam to the second chassis;

a second log bunk mounted on the load transfer beam at a position spaced between the trunnion and the tag axle for supporting a rear portion of the load; and a pivot in the load transfer beam spaced between the log bunk and the tag axle;

said pivot having an axis tilted at an angle from vertical such that swinging of the rear portion of the load extension beam laterally of the second chassis increases loading of the tag axle and thereby induces the tag axle to track in a centered position behind the trailer axle.

11. An assembly according to claim 10 in which the trunnion and pivot are oriented and positioned to permit angular movement about perpendicular axes spaced forward and aft, respectively, of the second log bunk so that the load transfer beam, tag axle, second log bunk and the load portion supported thereby can move as a unit angularly about a horizontal axis to equilibrate load distribution between the tag axle and the tandem axle and so that the tag axle can swing relative to the second chassis, trunnion and load bunk about a generally vertical axis during turns to track behind the tandem axle independently of the rear portion.

12. An assembly according to claim 10 in which the trunnion is spaced between the tandem axles;
the pivot is spaced rearward of the tandem axles; and the second log bunk is spaced between the trunnion and pivot so as to transfer a fraction of the rear portion of the load through the pivot to the tag axle.

13. An assembly according to claim 10 in which the trailer includes an extendable reach coupled by a hitch to the rear end of the first chassis.

14. An assembly according to claim 13 in which the trunnion is positioned sufficiently aft of a midpoint between the tandem axles to unload the reach and hitch.

15. An assembly according to claim 10 in which the log bunks are pivotally mounted on the first chassis and the load transfer beam, respectively, so that the log load portion can pivot about vertical axes independently of the first and second chassis and the load transfer beam.

16. An assembly according to claim 10 in which the log bunks are pivotally mounted on the first chassis and the load transfer beam to pivot on vertical axes and to pull the tandem axles and load extension assembly as a unit and the trailer includes a compensating reach means for steering the tandem axles and the load extension assembly as a unit so that the vertical pivot axes traverse a common arc during a turn.

17. A tractor-trailer and load extension assembly for carrying a load of logs, comprising:
a tractor having a first, axle-driven chassis and a first log bunk mounted on the chassis for carrying a front portion of the load;
a trailer having a second chassis mounted on a tandem axle and steerably hitched to a rear end of the first chassis;
a load extension assembly including a load transfer beam connected at its front end to the second chassis and a rear carried on a tag axle to trail behind the trailer;
a trunnion pivotally connecting the front end of the load transfer beam to the second chassis;
a second log bunk mounted on the load transfer beam at a position spaced between the trunnion and the tag axle for supporting a rear portion of the load; and
a pivot in the load transfer beam spaced between the log bunk and the tag axle;
extension means between the pivot and the tag axle for adjusting the length of the load transfer beam, the extension means including a remotely-controllable actuator selectably operable to enable adjustment of the length of the load transfer beam; and
a brake control circuit operable by a first driver control means to actuate brake means for braking the tandem axle and tag axle, the circuit including a subcircuit operable by a second driver control means and coupled to the actuator and to a brake means for simultaneously enabling adjustment of the length of the load transfer beam and braking the tag axle without braking the tandem axle so that the tandem axle can be rolled while the tag axle is immobilized to extend or retract the load extension beam.

18. An assembly according to claim 17 in which the extension means is operable to lengthen distribution of the load over a range of about 7 feet to about 10 feet.

19. An assembly according to claim 17 in the load transfer beam has a length when retracted such that the trailer and load extension assembly can be carried on the tractor chassis.

20. A load extension axle assembly comprising:
an elongate load transfer beam including a forward portion and an elongate rearward portion;
means for mounting the forward portion of the load transfer beam on a chassis carried on a first axle;
means for mounting the rearward portion of the load transfer beam on a second axle so that the assembly trails behind the chassis and the first axle;
means for supporting a load on the forward portion of the load transfer beam so that a first portion of the load is borne by the first axle and a second portion of the load is transferred rearward by the load transfer beam to be borne by the second axle; and
slidable adjustment means for slidably positioning the second axle along the rearward portion to extend or retract the load extension beam,
the slidable adjustment means including a sleeve slidably receiving the rear portion of the load transfer beam and clamping means actuable for selectably clamping and releasing the rear portion within the sleeve means; and
actuator means for actuating the clamping means, the clamping means including a band surrounding the rear portion of the load transfer beam within the sleeve and the actuator means including a linear actuation member connected to the band for tightening and loosening the band around said rear portion.

21. An assembly according to claim 20 in which the pivot means has an axis tilted at an angle from vertical such that swinging of the rear portion of the load extension beam laterally of the chassis increases loading of the tag axle and thereby induces the tag axle to track in a centered position behind the tandem axles.

22. An assembly according to claim 20 in which the slidable adjustment means includes bearing means for substantially frictionlessly engaging upper and lower sides of the rear portion of the load transfer beam to permit sliding thereof under load.

23. An assembly according to claim 20 in which:
the slidable adjustment means includes a structural sleeve having a first internal polygonal cross section;
the rear portion has a second external polygonal cross section sized and shaped to fit loosely within the first cross section; and
the sleeve includes bushings sized and shaped to fit comformably between the first and second polygonal cross sections.

24. An assembly according to claim 23 in which the first and second cross sections each have a vertical dimension greater than their respective horizontal dimensions.

25. An assembly according to claim 23 in which the first and second cross sections are sized and shaped to resist twisting of the rear portion within the sleeve.

26. An assembly according to claim 20 including a layer of lower friction material surrounding said rear portion under said band.

27. A load extension axle assembly comprising:
an elongate load transfer beam including a forward portion and an elongate rearward portion;
means for mounting the forward portion of the load transfer beam on a chassis carried on a first axle;
means for mounting the rearward portion of the load transfer beam on a second axle so that the assembly trails behind the chassis and the first axle;
means for supporting a load on the forward portion of the load transfer beam so that a first portion of the load is borne by the first axle and a second portion of the load is transferred rearward by the load transfer beam to be borne by a second axle; and
slidable adjustment means for slidably positioning the second axle along the rearward portion to extend or retract the load extension beam;
the slidable adjustment means including a structural sleeve having a pentagonal cross section;
the rear portion having a hexagonal cross section nested loosely within the pentagonal cross section; and the sleeve including bushings shaped to fit comformably between the hexagonal and pentagonal cross sections.

28. An assembly according to claim 27 in which the slidable adjustment means includes means defining a sleeve slidably receiving the rear portion of the load transfer beam and clamping means actuable for selectably clamping and releasing the rear portion within the sleeve means.

29. An assembly according to claim 28 including actuator means for actuating the clamping means, the clamping means including a band surrounding the rear portion of the load transfer beam within the sleeve and the actuator means including a linear actuation member connected to the band for tightening and loosening the band around said rear portion.

30. An assembly according to claim 28 including a remotely controllable actuator means for actuating the clamping means.

31. A load extension axle assembly comprising:
an elongate load transfer beam including a forward portion and an elongate rearward portion;
means for mounting the forward portion of the load transfer beam on a chassis carried on a first axle;
means for mounting the rearward portion of the load transfer beam on a second axle so that the assembly trails behind the chassis and the first axle;
means for supporting a load on the forward portion of the load transfer beam so that a first portion of the load is borne by the first axle and a second portion of the load is transferred rearward by the load transfer beam to be borne by a second axle; and
slidable adjustment means for slidably positioning the second axle along the rearward portion to extend or retract the load extension beam;
an assembly in which the slidable adjustment means includes means defining a sleeve slidably receiving the rear portion of the load transfer beam and clamping means actuable for selectably clamping and releasing the rear portion within the sleeve means;
an assembly including a remotely controllable actuator means for actuating the clamping means; and
a brake control circuit operable by a first driver control means to actuate brake means for braking the first and second axles, the circuit including a subcircuit operable by a second driver control means and coupled to the actuator means and to a brake means for simultaneously unclamping the clamping means and braking the second axle without braking the first axle so that the first axle can be rolled while the second axle is immobilized to extend or retract the load extension beam.

32. An assembly according to claim 31 in which the subcircuit is operable upon actuation of the clamping means to clamp the rear portion of the load extension beam and also to release the brake means of the second axle.

* * * * *

UNITED STATES PATENT AND TRADEMARK OFFICE
CERTIFICATE OF CORRECTION

PATENT NO. : 5,163,698

DATED : Nov. 17, 1992

INVENTOR(S) : Evens

It is certified that error appears in the above-identified patent and that said Letters Patent is hereby corrected as shown below:

Column 3        Line 58, change "educational" to "elevational";

Column 6        Line 45, change "rear" to "front";

Column 7        Line 21, change "54,55" to "55A,55B";

Column 7        Line 22, change "54" to "55A";

Column 7        Line 23, change "54" to "55A";

Column 7        Line 24, change "54" to "55A";

UNITED STATES PATENT AND TRADEMARK OFFICE
CERTIFICATE OF CORRECTION

PATENT NO. : 5,163,698
DATED : Nov. 17, 1993
INVENTOR(S) : Evens

It is certified that error appears in the above-indentified patent and that said Letters Patent is hereby corrected as shown below:

| | |
|---|---|
| Column 7 | Line 26, change "55" to "55B"; |
| Column 7 | Line 29, change "55" to "55B"; |
| Column 7 | Line 30, change "55" to "55B"; |
| Column 7 | Line 59, change "50" to "51"; |
| Column 7 | Line 61, change "50" to "51"; |
| Column 7 | Line 63, change "50" to "51"; |
| Column 8 | Line 8, change "chamber" to "actuator"; |
| Column 8 | Line 52, change "elongated" to "elongate"; |
| Column 8 | Line 58, change "connected" to "connecting"; |
| Column 9 | Line 8, change "pivotal" to "pivot"; |

UNITED STATES PATENT AND TRADEMARK OFFICE
CERTIFICATE OF CORRECTION

PATENT NO. : 5,163,698  
DATED : Nov. 17, 1992  
INVENTOR(S) : Evens

Page 3 of 3

It is certified that error appears in the above-identified patent and that said Letters Patent is hereby corrected as shown below:

| | |
|---|---|
| Column 10 | Line 6, change "pivotal" to "pivot"; |
| Column 10 | Line 24, after "rear" insert "end"; |
| Column 10 | Line 51, after "rear" insert "load"; |
| Column 11 | Line 1, change "portion" to "portions"; |
| Column 11 | Line 21, after "rear" insert "end"; |
| Column 11 | Line 24, delete "the"; |

Signed and Sealed this

Twenty-sixth Day of April, 1994

Attest:

BRUCE LEHMAN

*Attesting Officer*  *Commissioner of Patents and Trademarks*